(12) United States Patent
Schreiber et al.

(10) Patent No.: US 9,992,461 B1
(45) Date of Patent: Jun. 5, 2018

(54) PROJECTION ORIENTATION CORRECTION SYSTEM FOR VEHICLE

(71) Applicants: Hyundai America Technical Center, Inc, Superior Township, MI (US); Hyundai Motor Europe Technical Center GmbH, Russelsheim (DE); Hyundai Motor Company, Seoul (KR); Kia Motors Corporation, Seoul (KR)

(72) Inventors: Michael Schreiber, Frankfurt am Main (DE); Nilesh Patel, Canton, MI (US); Stefan Lessmann, Frankfurt am Main (DE); Gregory Ardisana, Canton, MI (US); Amanda Christiana, Ann Arbor, MI (US)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days. days.

(21) Appl. No.: 15/427,368

(22) Filed: Feb. 8, 2017

(51) Int. Cl.
| | |
|---|---|
| *H04N 9/31* | (2006.01) |
| *G06T 7/73* | (2017.01) |
| *G06T 11/60* | (2006.01) |
| *G06K 9/00* | (2006.01) |
| *G06F 3/01* | (2006.01) |
| *G01C 21/36* | (2006.01) |
| *B60R 11/04* | (2006.01) |

(52) U.S. Cl.
CPC ............ *H04N 9/3141* (2013.01); *B60R 11/04* (2013.01); *G01C 21/365* (2013.01); *G01C 21/3664* (2013.01); *G06F 3/017* (2013.01); *G06K 9/00476* (2013.01); *G06T 7/73* (2017.01); *G06T 11/60* (2013.01); *H04N 9/3185* (2013.01); *H04N 9/3194* (2013.01); *G06T 2207/30196* (2013.01)

(58) Field of Classification Search
CPC .. H04N 9/3141; H04N 9/3185; H04N 9/3194; G06T 7/73; G06T 11/60; G06T 2207/30196; B60R 11/04; G01C 21/365; G01C 21/3664; G06F 3/017; G06K 9/00476
See application file for complete search history.

(56) References Cited

U.S. PATENT DOCUMENTS

| | | | |
|---|---|---|---|
| 9,160,993 B1* | 10/2015 | Lish | .................... H04N 5/23229 |
| 2005/0125121 A1* | 6/2005 | Isaji | ...................... B60W 30/08 |
| | | | 701/36 |
| 2008/0195315 A1* | 8/2008 | Hu | ..................... G01C 21/3647 |
| | | | 701/455 |

(Continued)

FOREIGN PATENT DOCUMENTS

| | | |
|---|---|---|
| DE | 10034381 A1 | 1/2002 |
| DE | 102010010314 A1 | 9/2011 |

*Primary Examiner* — Michael Teitelbaum
(74) *Attorney, Agent, or Firm* — Mintz Levin Cohn Ferris Glovsky and Popeo, P.C.; Peter F. Corless

(57) ABSTRACT

A method includes: projecting, using a projection device equipped on a vehicle, an image onto ground nearby the vehicle; detecting a position or a point of view of a user; and rotating the projected image or at least one object within the projected image based on the detected position or point of view of the user. The projected image or the at least one object within the projected image is rotated such that the projected image or the at least one object within the projected image is oriented to face the user.

19 Claims, 19 Drawing Sheets

(56) References Cited

U.S. PATENT DOCUMENTS

| | | | |
|---|---|---|---|
| 2012/0050138 A1* | 3/2012 | Sato | B60K 35/00 345/4 |
| 2013/0321402 A1 | 12/2013 | Moore et al. | |
| 2016/0246061 A1* | 8/2016 | Bickerstaff | G06F 3/012 |

* cited by examiner

| Projector (500) | Reference Coordinate System (600) Rotation | | | |
|---|---|---|---|---|
| | Viewer Position | | | |
| | 1 | 2 | 3 | 4 |
| Left Hand Side (LH) | -90° + α | 0° + α | 180° + α | 90° + α |
| Rear | NA | -90° + α | 90° + α | 0° + α |
| Right Hand Side (RH) | 90° + α | 180° + α | 0° + α | -90° + α |
| Front | NA | 90° + α | -90° + α | 180° + α |

α : Vehicle Orientation

FIG. 7

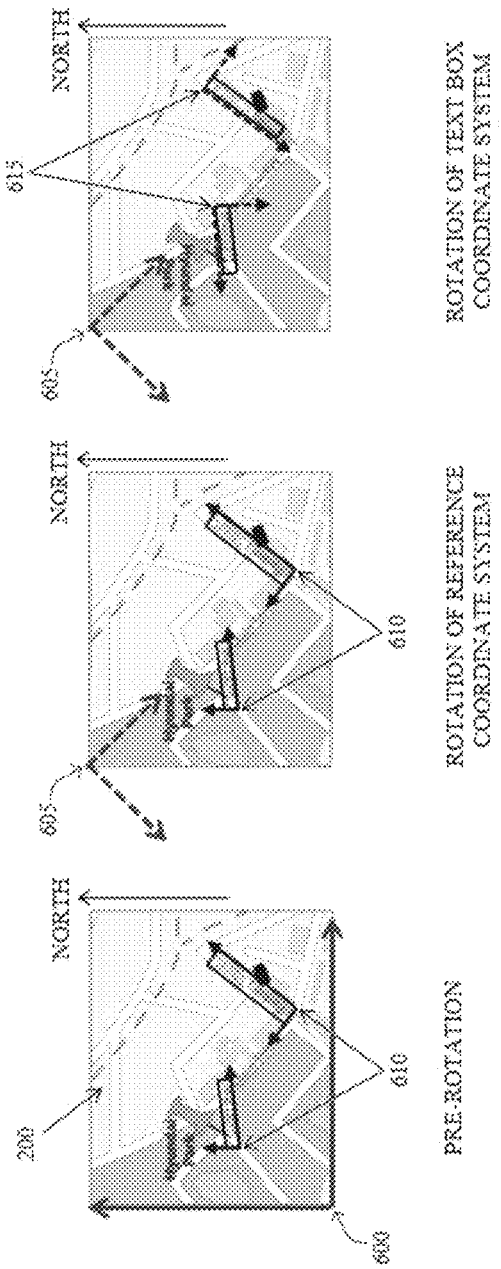

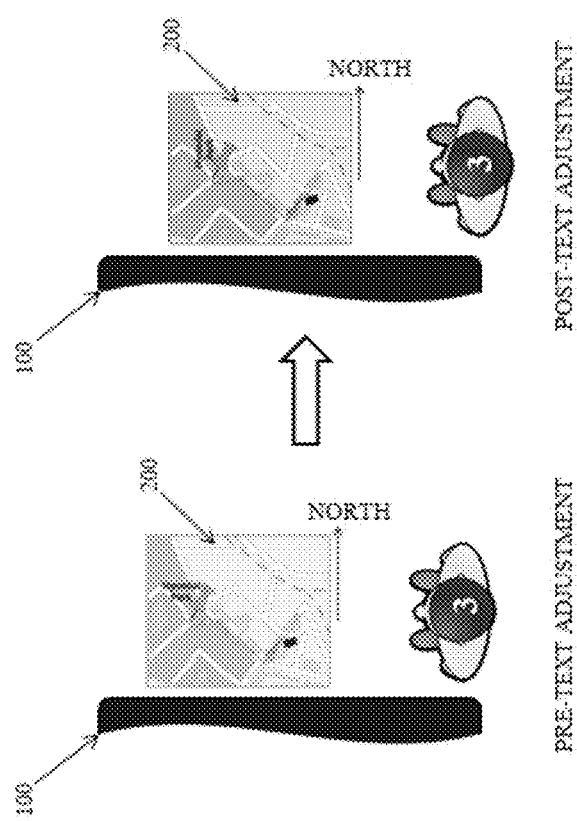

PROJECTION ORIENTATION CORRECTION SYSTEM FOR VEHICLE

TECHNICAL FIELD

The present disclosure relates generally to projection systems and, more particularly, to a projection orientation correction system for a vehicle.

BACKGROUND

Navigation systems are often used in conjunction with vehicular travel to direct a user of a vehicle (e.g., driver or passenger) to a destination selected by the user. For various reasons, however, the user may not always arrive at the exact location of the destination, leaving a distance remaining between the vehicle and the destination that the user must walk. For example, if a user drives a vehicle to a restaurant, shop, theater, or the like, and the user is required to park the vehicle, there will be a distance remaining between the location of the parked vehicle and the destination. In another example, if a user takes a taxi to a destination, there will be a distance remaining between the location at which the user is dropped off and the destination. In yet another example, a user utilizing a ride sharing service may be transported to a drop off location and required to walk from there to a meeting point with friends.

In either scenario, the distance remaining between the vehicle from which the user exits and the destination may be significant depending on circumstances. Furthermore, the location at which the user exits the vehicle may be unfamiliar, and as a result, the directions from the vehicle to the destination may not be clear. This can ultimately hinder the user from reaching his or her destination.

SUMMARY

The present disclosure provides techniques for projecting an image using a projection system equipped on a vehicle onto ground nearby the vehicle, detecting a position or point of view of a user, and automatically adjusting an orientation of the projected image or one or more objects within the image according to the position or point of view of the user. The image projected by the projection system of the vehicle may be a visual representation of directions to a destination selected by the user, such that the representation is viewable by the user upon exiting the vehicle. The projected image may include a map showing the current location of the vehicle and the user's destination, as well as directions overlaying the map indicating a path for the user to follow while walking from the vehicle to the destination. Various techniques can be employed to detect the position and/or point of view (i.e., orientation) of the user, e.g., using a camera system equipped on the vehicle, and the orientation of the projected image may be automatically adjusted so information in the image is easily discernable by the user.

According to embodiments of the present disclosure, a method includes: projecting, using a projection device equipped on a vehicle, an image onto ground nearby the vehicle; detecting a position or a point of view of a user; and rotating the projected image or at least one object within the projected image based on the detected position or point of view of the user. The projected image or the at least one object within the projected image is rotated such that the projected image or the at least one object within the projected image is oriented to face the user.

The projected image may include a map showing a route from a current position of the vehicle to a destination indicated by the user. The at least one object within the projected image may be overlaid on a map. The at least one object within the projected image may include at least one of text and a symbol.

The method may further include detecting the position of the user using one or more of: a camera equipped on the vehicle, an ultrasonic sensor equipped on the vehicle, and information received from a mobile device of the user that is communicatively coupled to the vehicle. Also, the method may further include detecting the point of view of the user using a camera equipped on the vehicle.

The projection device for projecting the image onto ground nearby the vehicle may be one of a plurality of projection devices. In this regard, the method may further include: identifying a door of the vehicle which has been opened by the user; selecting a projection device among a plurality of projection devices equipped on the vehicle to project the image based on the identified door; and projecting the image using the selected projection device. In addition, the method may further include: detecting the position of the user; selecting a projection device among a plurality of projection devices equipped on the vehicle to project the image based on the detected position of the user; and projecting the image using the selected projection device. Also, the method may further include: selecting a first projection device among a plurality of projection devices equipped on the vehicle to project the image; projecting the image using the selected first projection device; detecting the position of the user; selecting a second projection device among the plurality of projection devices different from the first projection device to project the image based on the detected position of the user; and projecting the image using the selected second projection device.

The projected image and/or at least one object within the projected image may be rotated based on the detected position or point of view of the user. In this regard, the method may further include: identifying a door of the vehicle which has been opened by the user; and rotating the projected image or the at least one object within the projected image based on the identified door such that the projected image or the at least one object within the projected image is oriented to face the user upon exiting the vehicle via the identified door. Additionally, the method may further include: detecting a first position or a first point of view of the user; rotating the projected image or the at least one object within the projected image based on the detected first position or first point of view of the user; detecting a second position or a second point of view of the user different from the first position or the first point of view of the user; and rotating the projected image or the at least one object within the projected image based on the detected second position or second point of view of the user. Also, the method may further include: detecting the position of the user; rotating the projected image based on the detected position of the user, such that the projected image is oriented to face the user; detecting the point of view of the user; and rotating the at least one object within the projected image based on the detected point of view of the user, such that the at least one object within the projected image is oriented to face the user.

The method may further include: detecting an orientation of the vehicle; and rotating the projected image or the at least one object within the projected image based further on the detected orientation of the vehicle. In addition, the method may further include: detecting the position of the user;

selecting a projection device among a plurality of projection devices equipped on the vehicle to project the image based on the detected position of the user; and rotating the projected image or the at least one object within the projected image based further on the selected projection device. Also, the method may further include: detecting the point of view of the user; rotating the at least one object within the projected image based on the detected point of view of the user; and rotating the projected image such that the projected image is oriented in a north direction.

A reference coordinate system can be applied to assist in rotation of the projected image and/or object within the image. In this regard, the method may further include: defining a reference coordinate system of the image and a reference coordinate system of the at least one object within the image; and rotating the projected image or the at least one object within the projected image by rotating the reference coordinate system of the image or the reference coordinate system of the at least one object within the image.

Various techniques can be employed to detect the point of view (i.e., orientation or perspective) of the user. For example, the detecting of the point of view of the user may include: acquiring an image of the user using a camera equipped on the vehicle; and detecting a position of eyes of the user by applying an eye detection algorithm to the acquired image. Also, the detecting of the point of view of the user may include: acquiring an image of the user using a camera equipped on the vehicle; and detecting an orientation of shoulders of the user by applying a shoulder detection algorithm to the acquired image.

The method may further include: detecting a gesture made by the user to interact with the projected image; and performing an action based on the detected gesture.

Furthermore, in accordance with embodiments of the present disclosure, a system includes: at least one projection device equipped on a vehicle and configured to project an image; and a control unit equipped in the vehicle and configured to: control the at least one projection device so as to project the image onto ground nearby the vehicle, detect a position or a point of view of a user, and rotate the projected image or at least one object within the projected image based on the detected position or point of view of the user. The projected image or the at least one object within the projected image is rotated such that the projected image or the at least one object within the projected image is oriented to face the user.

Furthermore, in accordance with embodiments of the present disclosure, a non-transitory computer readable medium contains program instructions executable by a control unit equipped in a vehicle, where the program instructions when executed cause the control unit to: project, via a projection device equipped on the vehicle, an image onto ground nearby the vehicle; detect a position or a point of view of a user; and rotate the projected image or at least one object within the projected image based on the detected position or point of view of the user. The projected image or the at least one object within the projected image is rotated such that the projected image or the at least one object within the projected image is oriented to face the user.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 7 illustrates an exemplary table for calculating a reference coordinate system rotation amount;

FIGS. 8A-8C illustrate an example rotation scenario of the projected image 200 and text within the projected image;

FIGS. 9A-9D illustrate example text rotation calculation scenarios;

Figure 1:
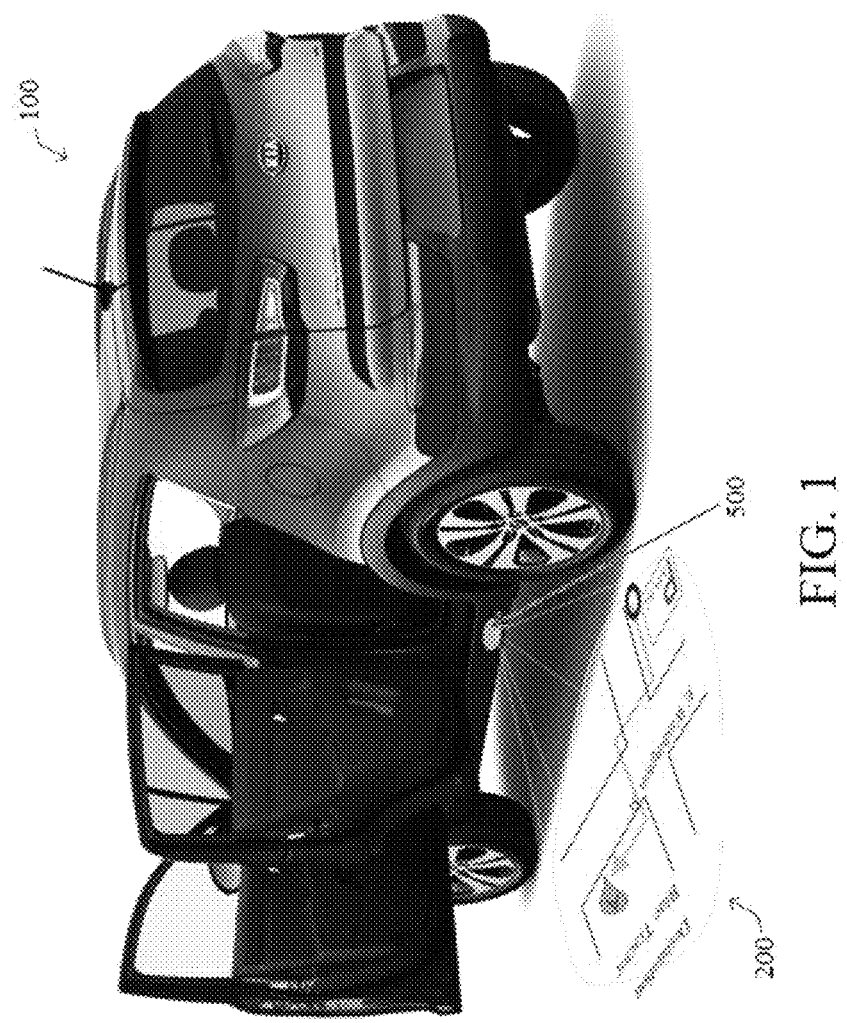
FIG. 1 illustrates an exemplary vehicle equipped with a projection system according to embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit. The term "control unit" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the control unit in conjunction with one or more other components, as would be appreciated by a person of ordinary skill in the art.

Furthermore, the control unit of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Referring now to embodiments of the present disclosure, the disclosed techniques utilize a series of one or more projection devices equipped in a vehicle capable of projecting an image onto ground nearby the vehicle. For instance, a navigation system can be utilized to determine a route from a current position of the vehicle to a destination inputted by the user, and the projection device(s) can project an image of the route on the ground nearby the vehicle such that the image is readily viewable by the user upon egress of the vehicle. The image may include a map of the vehicle's current position and the destination with walking directions to the destination overlaid on the map, allowing the user to easily ascertain the optimal route to the destination from the vehicle. Moreover, various techniques can be employed to detect the position and/or point of view (i.e., orientation or perspective) of the user, e.g., using a camera system equipped on the vehicle. Based on the detected position or point of view of the user, an orientation of the projected image or one or more objects within the image can be automatically adjusted (i.e., rotated) so information in the image is easily discernable by the user.

FIG. 1 illustrates an exemplary vehicle equipped with a projection system according to embodiments of the present disclosure. As shown in FIG. 1, the vehicle 100 may include one or more projection devices 500 operable to project an image onto ground nearby the vehicle 100. The projection device 500 may be any suitable projection device known in the art. The image 200 projected by the projection device 500 may include a map showing a current position of the vehicle 100 and a destination selected by a user (e.g., driver or passenger), as well as a route from the current position of the vehicle 100 to the destination. The route may include walking directions and/or public transit directions (if applicable or desired by the user) from the current position of the vehicle 100 to the destination overlaid on the map.

There may be at least one object within the image 200. The at least one object may include, for example, text (e.g., names of streets, landmarks, estimated duration of route, traffic conditions, etc.), a symbol or icon (e.g., current position marker, destination marker, landmark marker, etc.), and the like. As shown in FIG. 1, the object(s) may be overlaid on a map. Furthermore, such object(s) may be automatically rotated based on a position and/or point of view of the user, such that the object(s) are oriented to face the user, enhancing the legibility of the image 200. In some instances, the object(s) may be rotated either in conjunction with the image 200 or independent of the image 200, as explained in greater detail below.

The one or more projection devices 500 may be equipped in the vehicle 100 in a manner which enables the devices to project an image 200 onto the ground nearby the vehicle 100. For instance, a projection device 500 may be disposed proximate to any vehicle door (e.g., at a rocker panel beneath a door, as shown in FIG. 1) to allow the user to view the projected image 200 immediately upon exiting the vehicle 100 through said door. It should be noted, however, that the positioning of the projection device 500 on the vehicle 100 shown in FIG. 1 is merely one of many possible arrangements. Further, the image 200 may be projected by the projection device 500 in a manner which allows for optimal readability by automatically controlling display characteristics of the image 200, such as its angle, orientation, position, text attributes, and the like, based on a detected position and/or orientation of the user, as described in greater detail below.

Figure 2:
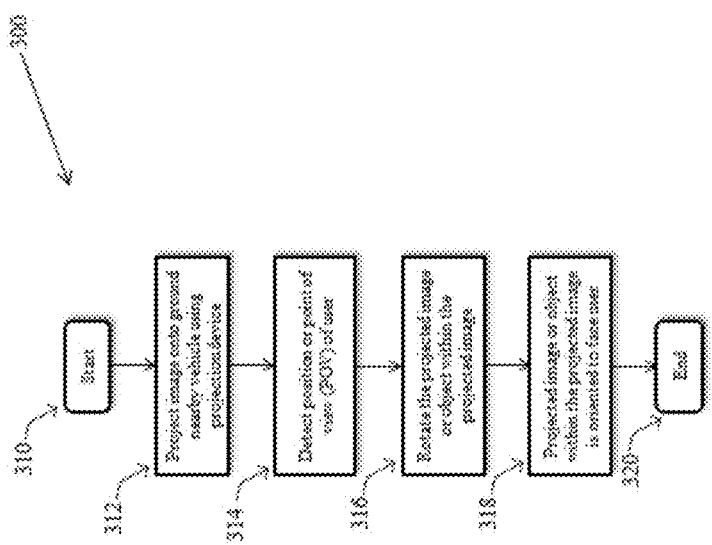
FIG. 2 illustrates an exemplary simplified procedure for operating a vehicle equipped with a projection system in accordance with embodiments of the present disclosure.

FIG. 2 illustrates an exemplary simplified procedure for operating a vehicle equipped with a projection system in accordance with embodiments of the present disclosure. The procedure 300 may start at step 310, and continue to step 312, where, as described in greater detail herein, an image 200 can be projected by a projection device 500 equipped on the vehicle 100 in an orientation which allows for optimal legibility on behalf of the user.

At step 312, an image 200 can be projected onto the ground nearby the vehicle 100 using a projection device 500 equipped on the vehicle 100. The projection device 500 may be one of a plurality of projection devices equipped in the vehicle 100. By way of example, without limitation, the vehicle 100 may be equipped with a first projection device 500 disposed on a right side of the vehicle 100, a second projection device 500 disposed on a left side of the vehicle 100, and a third projection device 500 disposed on a rear side of the vehicle 100. Thus, the image 200 may be projected by a particular projection device 500 among several such devices 500 at a given time. Further, the particular projection device 500 responsible for projecting the image 200 at a given time can change according to a detected position of the user after exiting the vehicle 100, as described in greater detail below.

Projection of the image 200 may be triggered upon detecting that the user is exiting the vehicle 100. Such detection may be performed in a variety of ways. For example, the vehicle 100 can monitor whether a door of the vehicle 100 has opened. Upon detecting that a vehicle door has been opened, it may be assumed that the user is exiting the vehicle 100. Additionally, or alternatively, cameras (e.g., around-view monitor (AVM) cameras), ultrasonic sensors, or the like mounted on the vehicle 100, or position data acquired by the user's mobile device and transmitted to the vehicle 100, may be utilized to determine whether the user is positioned outside of the vehicle 100. Such devices may also be used to determine a walking path of the user around the vehicle 100 and a point of view of the user, as described in greater detail below. As another example, vehicle seat sensors may be used to determine that a user is no longer sitting in a seat, in which case it may be assumed that the user is exiting the vehicle.

The projected image 200 may, for example, contain navigation information such as a route from a current position of the vehicle 100 to a destination selected by the user. In such case, the user may input his or her destination via any suitable means by which a control unit (not shown) of the vehicle 100 receives an indication of the destination, such as a navigation system equipped in the vehicle 100 or a mobile device of the user that is communicatively coupled to the vehicle 100, using a wireless (e.g., Bluetooth, wireless local area network (WLAN), Wi-Fi, infrared, etc.) or wired (e.g., universal serial bus (USB), etc.) connection.

Then, a route from a current position of the vehicle 100 to the inputted destination may be determined using any suitable navigation technique generally known in the art. For example, the control unit of the vehicle 100 may determine a route on the basis of acquired global position satellite (GPS) coordinates of the current position of the vehicle 100 and the destination, respectively, and digital maps stored locally in the vehicle 100 or stored on a remote server. Alternatively, a mobile device belonging to the user (not shown) may be leveraged by allowing the device to determine the route locally and transmit the determined route to the vehicle 100.

At step 314, the position and/or point of view of the user can be detected. For instance, the position of the user with respect to the vehicle 100 may be detected using one or more cameras (e.g., around-view monitor (AVM) cameras), ultrasonic sensors, or the like mounted on the vehicle 100, or position data acquired by the user's mobile device and transmitted to the vehicle 100. Such devices may also be used to determine a walking path of the user around the vehicle 100, as described in greater detail below. In addition, the point of view (i.e., orientation or perspective) of the user may be detected using one or more cameras mounted on the vehicle (e.g., see FIG. 13). Images of the user acquired by the camera(s) 700 can be analyzed to estimate the direction which the user is facing. In some cases, the standing position of the user with respect to the projected image 200 can be determined and used for the purposes of determining the point of view of the user. Additionally, or alternatively, algorithms for identifying body position or posture, such as shoulder detection algorithms (e.g., see FIG. 13), eye detection algorithms (e.g., see FIG. 14), and the like, can be employed.

At step 316, the detected position and/or point of view of the user can be used for the purpose of rotating the projected image 200 and/or object(s) within the projected image 200 to achieve optimal readability of information contained in the image 200. Particularly, the projected image 200 or at least one object within the projected image 200 can be rotated such that the projected image 200 or the at least one object within the projected image 200 is oriented to face the user (step 318).

In one example, if a door of the vehicle 100 opens, the projected image 200 or at least one object within the projected image 200 may be rotated such that the projected image 200 or the at least one object within the projected image 200 is oriented to face the user as the door opens and the user exits the vehicle 100 via the opened door. After exiting the vehicle 100, the position and/or point of view of the user can be monitored to determine if the image 200 and/or object(s) within the image 200 should be rotated. In some cases, the image 200 and/or object(s) within the image 200 may be rotated multiple times, depending on the detected position and/or point of view of the user, such that the image 200 and/or object(s) within the image are consistently oriented to face the user during the user's movement around the vehicle 100.

In another example, the user may interact with the image 200 when it is projected on the ground. The user could use hand gestures, foot gestures, and the like to perform an action with respect to the projected image 200. For instance, the user could zoom-in/zoom-out, pan left/right/up/down, rotate, or otherwise manipulate the projected image 200. Also, the user interact with the image 200 to perform other functions such as reserving a table at a restaurant, check-in to a hotel, rate the driver, etc.

The procedure 300 illustratively ends at step 320. The techniques by which the steps of procedure 300 may be performed, as well as ancillary procedures and parameters, are described in detail herein.

Figure 3:
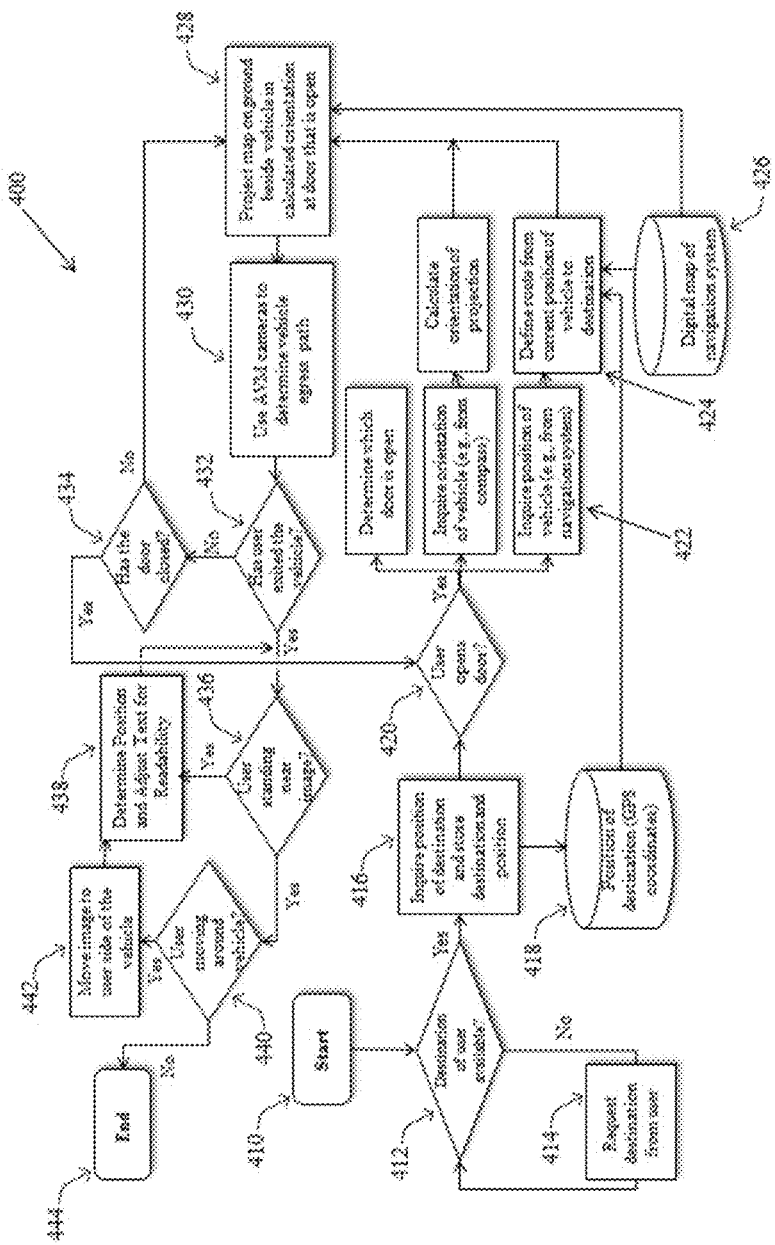
FIG. 3 illustrates an exemplary detailed procedure for operating a vehicle equipped with a projection system in accordance with embodiments of the present disclosure.

It should be noted that the steps shown in FIG. 2 are merely examples for illustration, and certain other steps may be included or excluded as desired (e.g., as shown in FIG. 3). Further, while a particular order of the steps is shown, this ordering is merely illustrative, and any suitable arrangement of the steps may be utilized without departing from the scope of the embodiments herein. Even further, the illustrated steps may be modified in any suitable manner in accordance with the scope of the present claims.

FIG. 3 illustrates an exemplary detailed procedure for operating a vehicle equipped with a projection system in accordance with embodiments of the present disclosure. The procedure 400 may start at step 410, and continue to step 412, where, as described in greater detail herein, an image 200 of a route from a current position of the vehicle 100 to a destination selected by a user can be projected by a projection device 500 equipped in the vehicle 100 upon the user exiting the vehicle 100 and rotated according to the position and/or point of view of the user, such that the projected image 200 and information therein is easily discernable by the user, such that the projected image 200 is viewable by the user.

Initially, it can be determined whether a destination indicated by a user is available (step 412). If a destination has not yet been inputted by the user (e.g., via a navigation system equipped in the vehicle 100 or a mobile device of the user that is communicatively coupled to the vehicle 100), a request for a destination can be sent to the user (step 414). For instance, a notification can be sent to the user's mobile device requesting a destination, a prompt can be displayed on a navigation system screen equipped in the vehicle 100 requesting a destination, and so forth. When a destination has been received from the user, the vehicle 100 may determine the position of the destination (e.g., latitude and longitude) and store the destination and/or its determined position (step 416). To this end, the vehicle 100 may obtain the GPS position (i.e., GPS coordinates) of the destination by communicating with GPS satellites (step 418).

At step 420, it can be determined whether the user has exited the vehicle 100. In one implementation, the vehicle 100 may detect that a door of the vehicle 100 has opened. In such case, it can be determined that a user is exiting or has exited the vehicle 100 when a vehicle door has been opened. Alternatively, or additionally, it can be determined whether a user has exited the vehicle 100 using other techniques. For example, ultrasonic sensors equipped on the vehicle 100 can detect the presence of the user outside of the vehicle 100. As another example, AVM cameras equipped on the vehicle 100 can detect the presence of the user outside of the vehicle 100. As yet another example, location information can be obtained by the vehicle 100 from the mobile device of the user and analyzed by the vehicle 100 to determine that the user is outside of the vehicle 100. It should be understood, therefore, that various techniques for detecting that the user is exiting the vehicle 100 are possible.

In response to detecting that the user is exiting the vehicle 100, various steps can be performed to prepare for projection an image 200 of the route from the current position of the vehicle 100 to the destination. For instance, at step 422, the vehicle 100 can detect which door has been opened to determine which projection device 500 to activate for projecting the image 200 (if the vehicle 100 is equipped with a plurality of projection devices 500). Also, the vehicle 100 can determine its orientation (e.g., using an internal compass), which can be utilized to calculate the appropriate projection orientation/angle of the image 200 (step 424). In addition, the current position (i.e., GPS coordinates) of the vehicle 100 can be determined (e.g., using the vehicle's built-in navigation system).

Then, at step 424, a route from the current position of the vehicle 100 to the destination selected by the user can be calculated. For example, the control unit of the vehicle 100 may determine the route on the basis of the acquired global position satellite (GPS) coordinates of the current position of the vehicle 100 and the destination, respectively, and digital maps stored locally in the vehicle 100 or stored on a remote server (step 426). Alternatively, the mobile device belonging to the user may be leveraged by allowing the device to determine the route locally and transmit the determined route to the vehicle 100.

At step 428, a projection device 500 equipped on the vehicle 100 can project an image 200 of the calculated route from the current position of the vehicle to the user's destination onto ground nearby the vehicle 100, such that the projected image 200 is viewable by the user upon exiting the vehicle 100. The projected image 200 may include a map showing the current position of the vehicle 100 and the destination as well as walking directions from the current position of the vehicle 100 to the destination overlaid on the map.

As explained above, the vehicle 100 may be equipped with a plurality of projection devices 500. For instance, without limitation, the vehicle 100 may be equipped with a first projection device 500 disposed on a right side of the vehicle 100, a second projection device 500 disposed on a left side of the vehicle 100, and a third projection device 500 disposed on a rear side of the vehicle 100. Thus, depending on the position of the user, a projection device 500 closest to the user can be selected for projecting the image 200.

In this regard, after identifying which door of the vehicle 100 has opened (step 422), a projection device 500 among the plurality of projection devices 500 can be selected to project the image 200 based on the identified opened door. For instance, if a passenger-side door is opened, a projection device 500 on the passenger-side of the vehicle 100 can be selected to project the image 200.

Furthermore, the egress path of the user outside of the vehicle 100 can be monitored once the user has exited the vehicle (e.g., using one or more cameras equipped on the vehicle 100, using ultrasonic sensors, etc.). By doing so, the projection device 500 used for projecting the image 200 can change as the user's position around the vehicle 100 changes or the user's point of view changes, such that the projected image 200 is easily viewable by the user even as the user is walking around the vehicle 100, as described in greater detail below.

Once it is confirmed that the user has exited the vehicle 100 (step 432), the vehicle 100 may determine whether the user is standing near the projected image 200 (step 436) or moving around the vehicle 100 (step 440). On the other hand, if the vehicle door has closed (step 436), indicating that the user is not exiting the vehicle 100 at the moment, the procedure 400 may return to step 420 where the vehicle 100 continues to monitor whether the user leaves the vehicle 100 (e.g., whether the vehicle door has re-opened).

If the user is standing near the projected image 200, the vehicle 100 may determine display characteristics for the projected image 200 for optimal readability (step 438). In this regard, the image 200 may be projected by the projection device 500 in a manner which allows for optimal readability by controlling display characteristics of the image 200, such as its angle, orientation, position, text attributes, and the like, based on the detected position and/or orientation of the user. For instance, images acquired by one or more cameras (not shown) disposed on the vehicle 100 can be analyzed to estimate a point of view of the user. Based on the estimated user point of view, an appropriate image orientation which allows the user to easily read the image 200 or object(s) within the image 200 can be determined, and the projection device 500 can project the image 200 with the determined orientation.

If the user is moving around the vehicle 100, a different projection device 500 may be selected based on the updated position of the user (step 442). For instance, if the user exits the passenger-side of the vehicle 100 and the passenger-side projection device 500 is initially activated to project the image 200, and then the user walks around the rear of the vehicle 100, the projection device 500 which projects the image 200 may change to the rear-side projection device 500 so the user can continue to view the image 200 even as the user is moving. Similarly, an angle, orientation, or other display characteristics of the image 200 can be changed in response to detecting that the user is moving around the vehicle 100 in order to maintain optimal readability.

When selecting a projection device 500 equipped on the vehicle for projecting the image 200, the projection device 500 responsible for projecting the image 200 may change if the user's location is changing, e.g., when the user is walking around the vehicle 100. For example, if the user exits the vehicle 100 from a passenger-side door, projection of the image 200 can be performed by the passenger-side/right-side projection device 500 (e.g., in response to detection of a passenger-side door being opened), such that the image 200 can be read by the user upon exiting the vehicle 100. If the user then begins to walk around the vehicle 100, the user's path may be detected using techniques described herein (e.g., one or more cameras installed on the vehicle 100, an ultrasonic sensor installed on the vehicle 100, information received from a mobile device of the user that is communicatively coupled to the vehicle 100, and the like). In response, the activated projection device 500 may change from the passenger-side/right-side projection device 500 to the rear projection device 500 as the user approaches the rear of the vehicle 100. Then, if the user passes the rear of the vehicle 100 and approaches the driver-side of the vehicle 100, the activated projection device 500 may again change from the rear projection device 500 to the driver-side/left-side projection device 500. This way, the user can maintain a substantially continuous view of the image 200 even as the position of the user is changing.

Along these same lines, the user may, for example, exit on a side of the vehicle 100 that is closest to roadway traffic and prefer to walk around to the other side of the vehicle 100 where it is safer to read the image 200 being projected. In such case, as described above, cameras mounted on the vehicle 100 can be used to analyze the user's path and determine whether the user has moved around to the other side of the vehicle 100. For instance, a series of photographs acquired by the vehicle's external camera system can be analyzed to determine the user's position with respect to the vehicle 100 and to determine whether the user is moving around the vehicle 100.

In response to determining that a user's position has changed after exiting the vehicle 100, projection of the image can be moved to the new position and display characteristics of the image 200 can be adjusted for optimal readability. When the user's position has changed, the control unit of the vehicle 100 may send an activation signal to the projection device 500 closest to the user. In addition, the standing position of the user can be analyzed (e.g., in the photographs acquired by the camera system) to determine user's point of view for the purpose of controlling projection display characteristics. For instance, the orientation of the map and any object within the projected image 200 can adjusted based on the user's point of view so the user can discern information in the image 200 as easily as possible.

Projection of the image 200 may eventually be deactivated, e.g., after a predetermined period of time elapses, if the user moves beyond a predetermined distance from the vehicle 100, etc.

The procedure 400 illustratively ends at step 444. The techniques by which the steps of procedure 400 may be performed, as well as ancillary procedures and parameters, are described in detail herein.

It should be noted that the steps shown in FIG. 3 are merely examples for illustration, and certain other steps may be included or excluded as desired (e.g., as shown in FIG. 2). Further, while a particular order of the steps is shown, this ordering is merely illustrative, and any suitable arrangement of the steps may be utilized without departing from the scope of the embodiments herein. Even further, the illustrated steps may be modified in any suitable manner in accordance with the scope of the present claims.

Figure 4B:
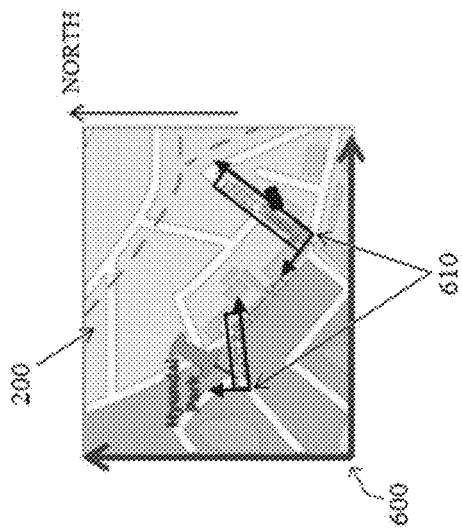
FIGS. 4A and 4B illustrate an exemplary reference coordinate system and exemplary text box coordinate system.
Figure 4A:
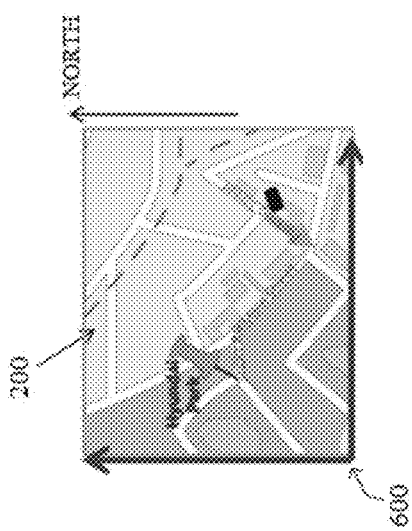

FIGS. 4A and 4B illustrate an exemplary reference coordinate system and exemplary text box coordinate system. Initially, when orienting the image 200 or object(s) within the image 200 for optimal readability, a static map image with north at the top can be used, where the image consists of a map image layer and a text layer. The map layer is a static image without text, while the text layer consists of text boxes that align with the direction of streets or are anchored to landmark locations. Then, as shown in FIG. 4A, a reference coordinate system 600 can be defined and applied to the image 200 starting at the bottom-left edge of the static map image with north at the top. Similarly, a reference coordinate system can be applied to at least one object within the image 200. As shown in FIG. 4B, a text box coordinate system 610 can be defined and applied to each text object within the image 200 starting at the bottom-left edge of the respective text object. The reference coordinate system 600 and text box coordinate system 610 (or symbol coordinate system, if applicable) can be utilized to orient the image 200 and text within the image 200 in a desired manner.

Figure 5:
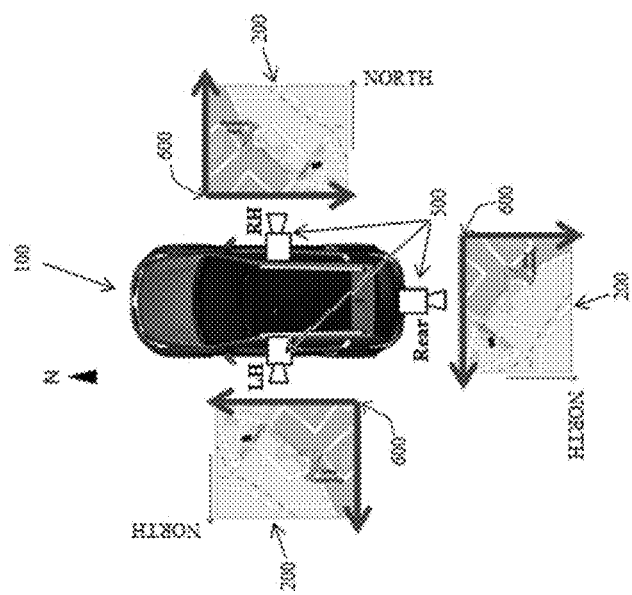
FIG. 5 illustrates example image projection orientations prior to rotation of an exemplary vehicle equipped with a projection system according to embodiments of the present disclosure.

FIG. 5 illustrates example image projection orientations prior to rotation of an exemplary vehicle equipped with a projection system according to embodiments of the present disclosure. As shown in FIG. 5, the vehicle 100 may be equipped with multiple projection devices 500 at various positions on the vehicle 100. Each projection device 500 should be configured to project an image 200 onto ground nearby the vehicle 100 such that the image 200 is visible to the user upon exiting the vehicle 100. In general, activation of projection by the projection devices 500 may be triggered by the opening of a vehicle door (though other events which indicate the user has exited the vehicle 100, such as those described above, may also trigger activation of the projection of the projection devices 500). The control unit of the vehicle 100 may send an activation signal to a projection device 500 to activate the device and initiate projection of the image 200.

As shown in the example arrangement depicted in FIG. 5, the vehicle 100 may be equipped with a first projection device 500 disposed on a right-hand (RH) side of the vehicle 100, a second projection device 500 disposed on a left-hand (LH) side of the vehicle 100, and a third projection device 500 disposed on a rear side of the vehicle 100. The projection devices 500 may be installed at various positions on the vehicle 100, such as a rocker panel adjacent to a door (as shown in FIG. 1), on a front or rear bumper, or the like. It should be understood that the arrangement of projection devices 500 shown in FIG. 5 is provided merely for demonstration purposes and does not limit the scope of the present disclosure thereto.

The projection devices 500 are capable of projecting the image 200 onto ground nearby the vehicle 100 in a desired orientation. In this regard, FIG. 5 shows the orientation of the projected image 200 by each of the left-hand (LH), right-hand (RH), and rear projection devices 500 prior to rotation of the image 200. That is, before the projected image 200 is rotated, each projection device 500 can project the image 200 in an orientation which allows information within the image 200 to be facing the user as he or she is exiting the vehicle 100 (e.g., as a vehicle door is opened).

Figure 6:
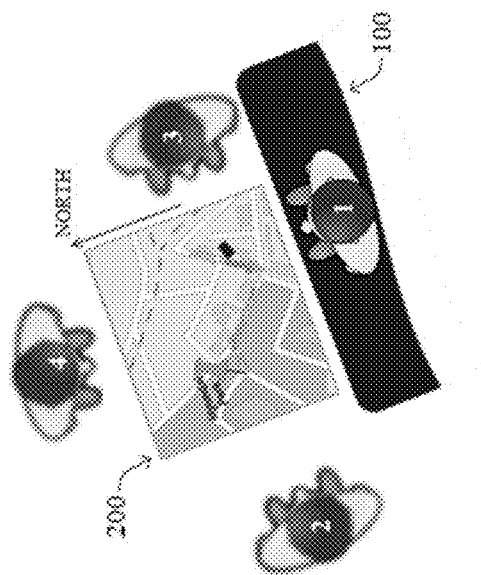
FIG. 6 illustrates exemplary user positions surrounding the projected image.

After exiting, the user may proceed to stand to the side of the image 200 to examine the map more closely, in which case the projected image 200 or object(s) within the image 200 can be rotated accordingly (e.g., using the reference coordinate system 600 and/or text box coordinate system 610). In this regard, FIG. 6 illustrates exemplary user positions surrounding the projected image 200. By detecting the position of the user, the projected image 200 or object(s) within the image 200 can be rotated such that the projected image 200 or object(s) within the projected image 200 is oriented to face the user.

As shown in FIG. 6, exemplary user positions may include, for example, a first position (1) in which the user is either positioned inside the vehicle 100 or next to the vehicle 100 facing outward; a second position (2) in which the user stands to the left of the image 200; a third position (3) in which the user stands to the right of the image 200; and a fourth position (4) in which the user faces the image 200 while also facing the vehicle 100 (behind the image 200 from the perspective of the user). The user's position with respect to the projected image 200 may be detected using various techniques, including, for example, a system of cameras 700 installed around the vehicle 100 (e.g., see FIG. 13), an ultrasonic sensor installed on the vehicle 100, information received from a mobile device of the user that is communicatively coupled to the vehicle 100, and the like. Using the detected position of the user, as well as the active projection device 500 and the orientation of the vehicle 100 (a), a rotation amount of the image 200 and object(s) within the image 200 can be calculated. It should be understood that the user positions depicted in FIG. 6 are provided for demonstration purposes only and should not be treated as limiting the scope of the present disclosure. Rather, any number of different user positions is possible, and appropriate rotation amounts can be calculated according to the principles described herein.

FIG. 7 illustrates an exemplary table for calculating a reference coordinate system 600 rotation amount. As shown in FIG. 7, three inputs can be utilized to calculate a rotation amount of the image 200: the detected position of the user (viewer), the active projection device 500, and the orientation of the vehicle 100 ($\alpha$). For the purpose of the calculation table in FIG. 7, an angle of 0° is equivalent to north, an angle of 90° is equivalent to east, an angle of 180° is equivalent to south, and an angle of 270° (−90°) is equivalent to west. Thus, in an example scenario where the left-hand side projection device 500 is active (i.e., the user is standing on the driver-side of the vehicle 100), and the user is standing in the fourth position (4) (i.e., the user is facing the image 200 and the vehicle 100), the image 200 may be rotated 90° from north offset by the orientation of the vehicle 100 ($\alpha$), allowing the user to view the image 200 while the image 200 and information therein is facing the user. Additional rotation calculation examples are provided in FIGS. 9A-9D.

In addition to rotating the projected image 200 (e.g., using the reference coordinate system 600), objects such as text, symbols, or the like within the image 200 can also be rotated in a corresponding manner. As explained above, a reference coordinate system can be defined for objects within the image 200, such as the text box coordinate system 610, which can be used to rotate an object within the image 200. In this regard, FIGS. 8A-8C illustrate an example rotation scenario of the projected image 200 and text within the projected image 200. Prior to any rotation, as shown in FIG. 8A, a reference coordinate system 600 may be applied to the image 200 such that the reference coordinate system 600 is oriented toward the north. Meanwhile, a text box coordinate system 610 may be applied to text objects (e.g., street names, landmark names, etc.) within the image 200 with the text box coordinate system 610 starting at the bottom-left edge of the respective text object.

As shown in FIG. 8B, the reference coordinate system 600 may be rotated according to the detected position of the user, the active projection device 500, and the orientation of the vehicle 100 ($\alpha$). In this example scenario, the user is detected to be standing in the fourth position (4) (i.e., facing the projected image 200 and the vehicle 100), the right-hand side (RH) projection device 500 is active, and the orientation of the vehicle 100 ($\alpha$) is −135°. According to the table in FIG. 7, the rotation amount of the reference coordinate system 600 is calculated to be −90°+(−135°), resulting in a rotation amount of −225° (or 135°). Thus, FIG. 8B shows a rotated reference coordinate system 605 after rotation of the reference coordinate system 600 has been performed.

As shown in FIG. 8C, the text box coordinate systems 610 may be rotated in a manner corresponding to the rotated reference coordinate system 605. Typically, the text box coordinate systems 610 may be rotated by the same amount as the reference coordinate system 600 of the image 200. However, if the bottom of any text box in the text layer, such as the two text boxes included in the image 200 shown in FIGS. 8A-8C, is offset more than 90° from the rotated reference coordinate system 605, the text boxes can be "flipped" 180° to provide a better viewing angle for the user. Thus, FIG. 8C shows rotated text box coordinate systems 615 after a rotation of 180°.

FIGS. 9A-9D illustrate example text rotation calculation scenarios. As shown in FIGS. 9A-9D, the image 200 is not rotated, and thus only text objects within the image 200 are rotated while the image 200 faces outward from the vehicle 100. It should be understood that in some cases both of the image 200 and object(s) within the image 200 may be rotated based on the detected user position. In such cases, the projected image 200 may be rotated based on the detected position of the user, such that the projected image 200 is oriented to face the user, while object(s) within the projected image 200 may be rotated based on the detected point of view of the user, such that the object(s) within the projected image 200 are oriented to face the user. Alternatively, in other cases (such as FIGS. 9A-9D) only the objects within the image 200 may be rotated based on the detected user position so the orientation of image 200 is maintained (e.g., in the north direction) while text (or any other object) within the image 200 is rotated for optimal readability.

Figure 9A:
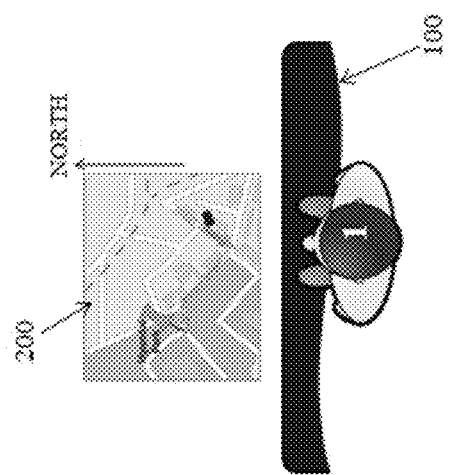

In the example shown in FIG. 9A, the user is standing in the first position (1) facing outward from the vehicle 100 (e.g., during egress of the vehicle 100). The initial orientation of the image 200 is facing outward from the vehicle 100, with north pointing in the opposite direction of the vehicle 100. In this case, objects within the image 200 need not be rotated as they already face the user in the first position (1) in their initial orientation. Thus, no rotation is necessary.

Figure 9B:
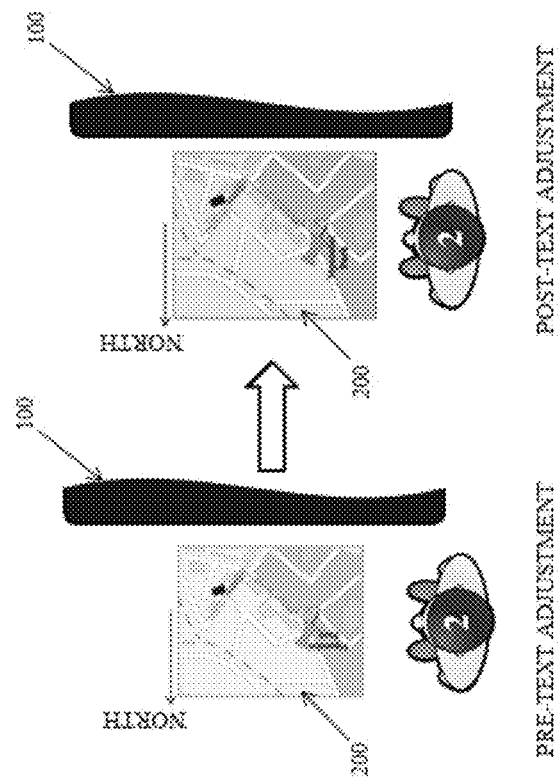

In the example shown in FIG. 9B, the user is standing in the second position (2) (e.g., left of the projected image 200), the user is standing on the driver-side of the vehicle 100, meaning the left-hand side (LH) projection device 500 should be active, and the vehicle 100 is rotated 90° with respect to north, meaning the vehicle orientation (a) is 90° (i.e., pointing east). With reference to FIG. 7, rotation of the text in the image 200 should be 90° (0°+$\alpha$) to orient the text to face the user in the detected position.

In the example shown in FIG. 9C, the user is standing in the third position (3) (e.g., right of the projected image 200), the user is standing on the passenger-side of the vehicle 100, meaning the left-hand side (RH) projection device 500 should be active, and the vehicle 100 is rotated −90° with respect to north, meaning the vehicle orientation ($\alpha$) is −90° (i.e., pointing west). With reference to FIG. 7, rotation of the text in the image 200 should be −90° (0°+$\alpha$) to orient the text to face the user in the detected position.

Figure 9D:
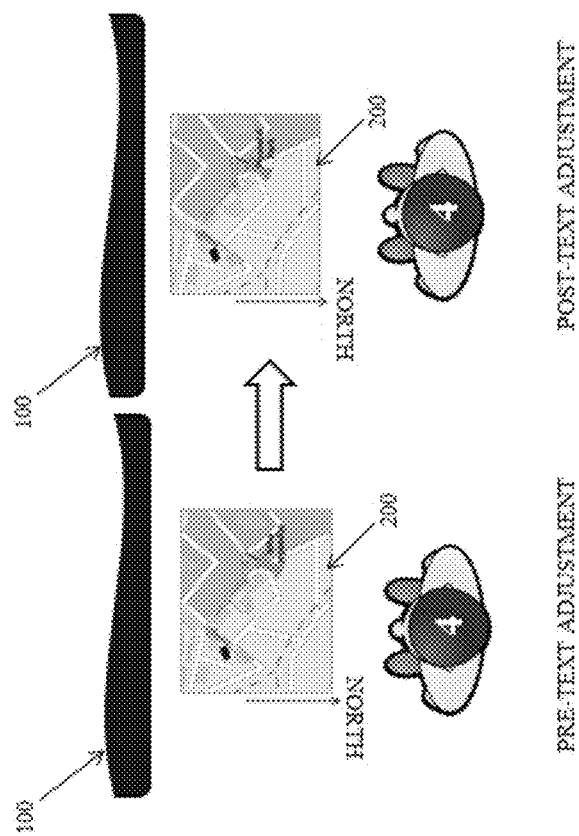
Figure 10:
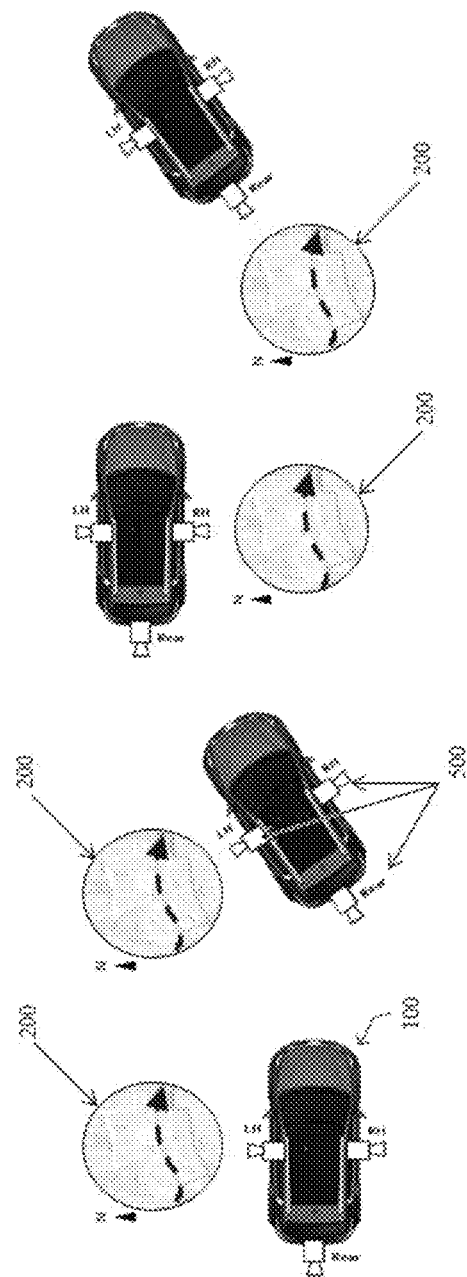
FIG. 10 illustrates an exemplary case in which the projected image is rotated to always orient north.

In the example shown in FIG. 9D, the user is standing in the fourth position (4) (e.g., the projected image 200 is between the user and the vehicle 100), the user is standing on the rear side of the vehicle 100, meaning the rear projection device 500 should be active, and the vehicle 100 is rotated 180° with respect to north, meaning the vehicle orientation ($\alpha$) is 180° (i.e., pointing south). With reference to FIG. 7, rotation of the text in the image 200 should be 180° (0°+$\alpha$) to orient the text to face the user in the detected position.

Like the examples shown in FIGS. 9A-9D, FIG. 10 illustrates an exemplary case in which the projected image 200 is rotated to always orient north regardless of the orientation of the vehicle 100 or the active projection device 500. Meanwhile objects within the image 200 (e.g., text, symbols, icons, logos, etc.) can be rotated according to the detected position and/or point of view of the user. This allows the user to effectively understand his or her current position on the map and the route to a particular destination, while also allowing the user to easily read objects within the image 200 which have been rotated to face the user.

Figure 11:
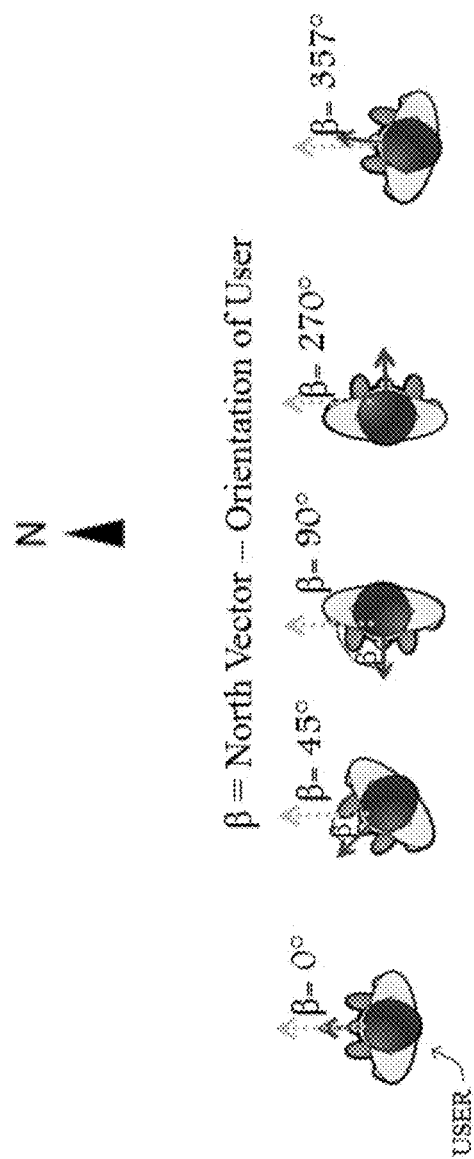
FIG. 11 illustrates example orientations of the user which can be utilized to calculate a rotation amount of objects within the projected image.

FIG. 11 illustrates example orientations of the user which can be utilized to calculate a rotation amount of objects within the projected image 200. As shown in FIG. 11, the angle (β) shows the difference between the orientation of the user and the north vector. The point of view (i.e., orientation or perspective) of the user may be detected using, for example, one or more cameras mounted on the vehicle (e.g., see FIG. 13). Images of the user acquired by the camera(s) 700 can be analyzed to estimate the direction which the user is facing. In some cases, the standing position of the user with respect to the projected image 200 can be determined and used for the purposes of determining the point of view of the user. Additionally, or alternatively, algorithms for identifying body position or posture, such as shoulder detection algorithms (e.g., see FIG. 13), eye detection algorithms (e.g., see FIG. 14), and the like, can be employed.

Figure 12A:
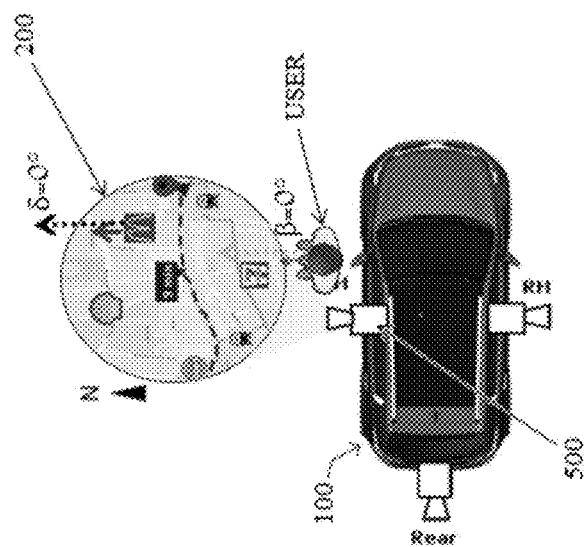
FIGS. 12A-12C illustrate additional example object rotation scenarios.
Figure 12B:
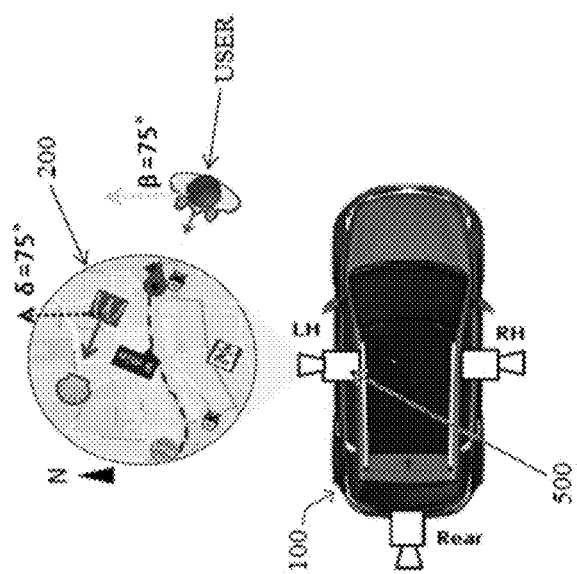
Figure 12C:
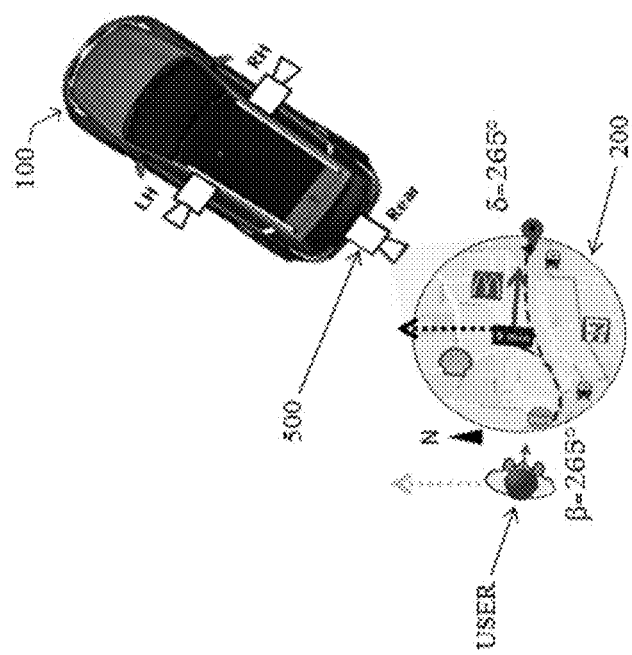

FIGS. 12A-12C illustrate additional example object rotation scenarios. By measuring the angle β of the user shown in FIG. 11 (i.e., the orientation of user against the north vector) and fixing the map in the projected image 200 in the north direction, objects within the image 200, such as text, symbols, icons, logos, etc., can be continuously oriented to face the user by rotating the objects according to the angle of the user. In particular, the angle (δ) of objects in the image 200 (i.e., the orientation of objects against the north vector) can be rotated to be identical to the measured orientation (β) of the user.

In the example shown in FIG. 12A, the angle (β) of the user is measured (e.g., using cameras 700) as 0° (i.e., facing north). Thus, because objects within the projected image 200 are initially oriented at an angle (δ) of 0°, no rotation is necessary since the orientation of objects within the image 200 already match that of the user.

In the example shown in FIG. 12B, the angle (β) of the user is measured (e.g., using cameras 700) as 75° (offset from the north vector). Thus, objects within the projected image 200 can be rotated to an angle (δ) of 75° to match the orientation of the user, such that the objects are facing the user, as the map is oriented to the north.

In the example shown in FIG. 12C, the angle (β) of the user is measured (e.g., using cameras 700) as 265° (offset from the north vector). Thus, objects within the projected image 200 can be rotated to an angle (δ) of 265° to match the orientation of the user, such that the objects are facing the user, as the map is oriented to the north.

As explained above, images of the user acquired by the camera(s) 700 can be analyzed to estimate the direction which the user is facing. In some cases, the standing position of the user with respect to the projected image 200 can be determined and used for the purposes of determining the point of view of the user (under the assumption that the user is facing the projected image 200 in order to view the image 200). Additionally, or alternatively, algorithms for identifying body position or posture, such as shoulder detection algorithms, eye detection algorithms, and the like, can be employed. In this regard, FIGS. 13 and 14 illustrate exemplary algorithms for detecting a point of view of the user.

Figure 13:
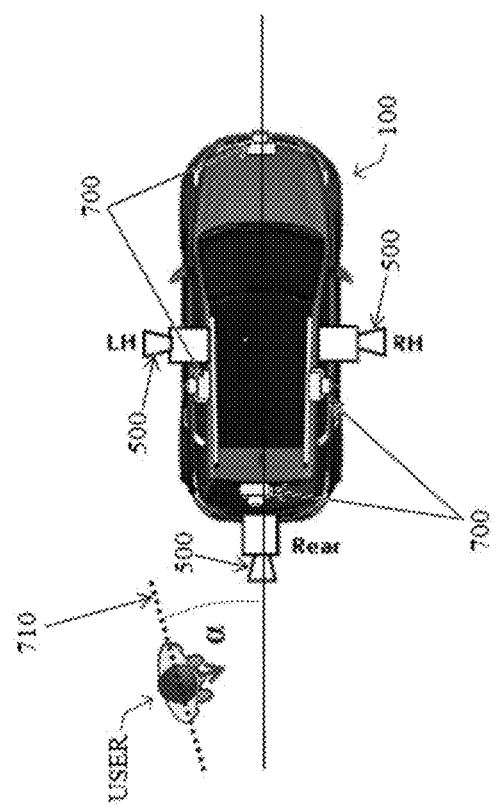
FIGS. 13 and 14 illustrate exemplary algorithms for detecting a point of view of the user.
Figure 14:
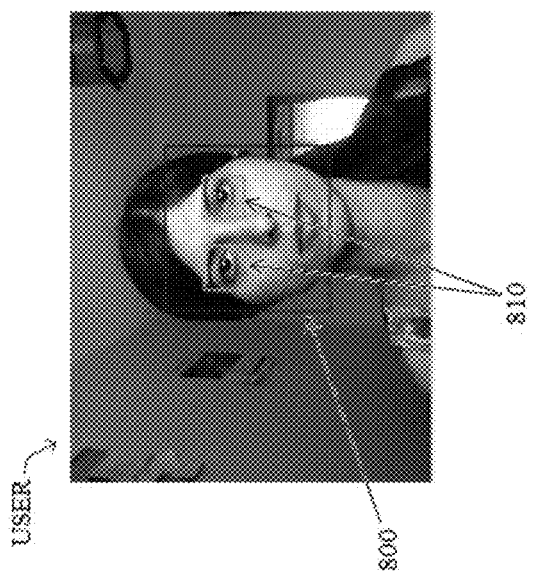

As shown in FIG. 13, the vehicle 100 may be equipped with one or more cameras 700 mounted thereon for the purpose of detecting the position and/or point of view of the user. In one example, the vehicle 100 may be provided with cameras mounted on the front, rear, left, and right sides of the vehicle 100, respectively. The camera(s) 700 can acquire images of the user, and such images can be analyzed (using a variety of image processing algorithms) to determine the point of view (i.e., gaze direction) of the user.

For instance, an image processing algorithm can be applied to determine the head position and shoulder orientation of the user. In the example shown in FIG. 13, the orientation of the user's shoulders 710 is offset by an angle of α with respect to a center line longitudinally traversing the vehicle 100. In such case, the user's point of view can be determined as perpendicular to the detected orientation of the user's shoulders 710, and objects within the projected image 200 (not shown in FIG. 13) can be rotated according to the user's point of view, as explained in detail above.

Moreover, an image processing algorithm can be applied to determine the head position and eye position of the user. In the example shown in FIG. 14, the user's head 800 and eyes 810 can be detected. The position of the user's eyes 810 can be used to determine the point of view of the user and then calculate a corresponding orientation of objects within the projected image 200. The image processing algorithms described above are generally known in the art and thus are beyond the scope of the present disclosure.

Accordingly, techniques are described herein that provide a user of a vehicle with an image projected on the ground nearby the vehicle using a projection device equipped on a vehicle, whereby the image is automatically rotated based on a detected position and/or point of view of the user such that the representation is viewable and easily discernable by the user upon exiting the vehicle. The projected image may include directions to a destination. After being provided with directions to the user's selected destination upon exiting the vehicle, the user can find his or her way to the destination more quickly and reliably.

While there have been shown and described illustrative embodiments that provide for vehicular navigation systems utilizing a projection device, it is to be understood that various other adaptations and modifications may be made within the spirit and scope of the embodiments herein. Therefore, the embodiments of the present disclosure may be modified in a suitable manner in accordance with the scope of the present claims.

The foregoing description has been directed to embodiments of the present disclosure. It will be apparent, however, that other variations and modifications may be made to the described embodiments, with the attainment of some or all of their advantages. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   projecting, using a projection device equipped on a vehicle, an image onto ground nearby the vehicle;
   detecting a position or a point of view of a user;
   rotating the projected image or at least one object within the projected image based on the detected position or point of view of the user,
   wherein the projected image or the at least one object within the projected image is rotated such that the projected image or the at least one object within the projected image is oriented to face the user;
   identifying a door of the vehicle which has been opened by the user;
   selecting a projection device among a plurality of projection devices equipped on the vehicle to project the image based on the identified door; and
   projecting the image using the selected projection device.

2. The method of claim 1, wherein the projected image includes a map showing a route from a current position of the vehicle to a destination indicated by the user.

3. The method of claim 1, wherein the at least one object within the projected image is overlaid on a map.

4. The method of claim 1, wherein the at least one object within the projected image includes at least one of text and a symbol.

5. The method of claim 1, further comprising:
detecting the position of the user using one or more of: a camera equipped on the vehicle, an ultrasonic sensor equipped on the vehicle, and information received from a mobile device of the user that is communicatively coupled to the vehicle.

6. The method of claim 1, further comprising:
detecting the point of view of the user using a camera equipped on the vehicle.

7. The method of claim 1, further comprising:
detecting the position of the user;
selecting a projection device among the plurality of projection devices equipped on the vehicle to project the image based on the detected position of the user; and
projecting the image using the selected projection device.

8. The method of claim 1, further comprising:
selecting a first projection device among the plurality of projection devices equipped on the vehicle to project the image;
projecting the image using the selected first projection device;
detecting the position of the user;
selecting a second projection device among the plurality of projection devices different from the first projection device to project the image based on the detected position of the user; and
projecting the image using the selected second projection device.

9. The method of claim 1, further comprising:
identifying a door of the vehicle which has been opened by the user; and
rotating the projected image or the at least one object within the projected image based on the identified door such that the projected image or the at least one object within the projected image is oriented to face the user upon exiting the vehicle via the identified door.

10. The method of claim 1, further comprising:
detecting a first position or a first point of view of the user;
rotating the projected image or the at least one object within the projected image based on the detected first position or first point of view of the user;
detecting a second position or a second point of view of the user different from the first position or the first point of view of the user; and
rotating the projected image or the at least one object within the projected image based on the detected second position or second point of view of the user.

11. The method of claim 1, further comprising:
detecting the position of the user;
rotating the projected image based on the detected position of the user, such that the projected image is oriented to face the user;
detecting the point of view of the user; and
rotating the at least one object within the projected image based on the detected point of view of the user, such that the at least one object within the projected image is oriented to face the user.

12. The method of claim 1, further comprising:
detecting an orientation of the vehicle; and
rotating the projected image or the at least one object within the projected image based further on the detected orientation of the vehicle.

13. The method of claim 1, further comprising:
detecting the position of the user;
selecting a projection device among the plurality of projection devices equipped on the vehicle to project the image based on the detected position of the user; and
rotating the projected image or the at least one object within the projected image based further on the selected projection device.

14. The method of claim 1, further comprising:
defining a reference coordinate system of the image and a reference coordinate system of the at least one object within the image; and
rotating the projected image or the at least one object within the projected image by rotating the reference coordinate system of the image or the reference coordinate system of the at least one object within the image.

15. The method of claim 1, further comprising:
detecting the point of view of the user;
rotating the at least one object within the projected image based on the detected point of view of the user; and
rotating the projected image such that the projected image is oriented in a north direction.

16. The method of claim 1, wherein the detecting of the point of view of the user comprises:
acquiring an image of the user using a camera equipped on the vehicle; and
detecting a position of eyes of the user or an orientation of shoulders of the user by applying an image processing algorithm to the acquired image.

17. The method of claim 1, further comprising:
detecting a gesture made by the user to interact with the projected image; and
performing an action based on the detected gesture.

18. A system comprising:
at least one projection device equipped on a vehicle and configured to project an image; and
a control unit equipped in the vehicle and configured to:
control the at least one projection device so as to project the image onto ground nearby the vehicle,
detect a position or a point of view of a user,
rotate the projected image or at least one object within the projected image based on the detected position or point of view of the user,
wherein the projected image or the at least one object within the projected image is rotated such that the projected image or the at least one object within the projected image is oriented to face the user;
identify a door of the vehicle which has been opened by the user;
select a projection device among a plurality of projection devices equipped on the vehicle to project the image based on the identified door; and
project the image using the selected projection device.

19. A non-transitory computer readable medium containing program instructions executable by a control unit equipped in a vehicle, wherein the program instructions when executed cause the control unit to:
project, via a projection device equipped on the vehicle, an image onto ground nearby the vehicle;
detect a position or a point of view of a user;

rotate the projected image or at least one object within the projected image based on the detected position or point of view of the user, wherein the projected image or the at least one object within the projected image is rotated such that the projected image or the at least one object within the projected image is oriented to face the user;

identify a door of the vehicle which has been opened by the user;

select a projection device among a plurality of projection devices equipped on the vehicle to project the image based on the identified door; and project the image using the selected projection device.

\* \* \* \* \*